Feb. 23, 1932.    J. R. ORELIND    1,846,651
VEHICLE FORE CARRIAGE
Filed April 30, 1928    2 Sheets-Sheet 2
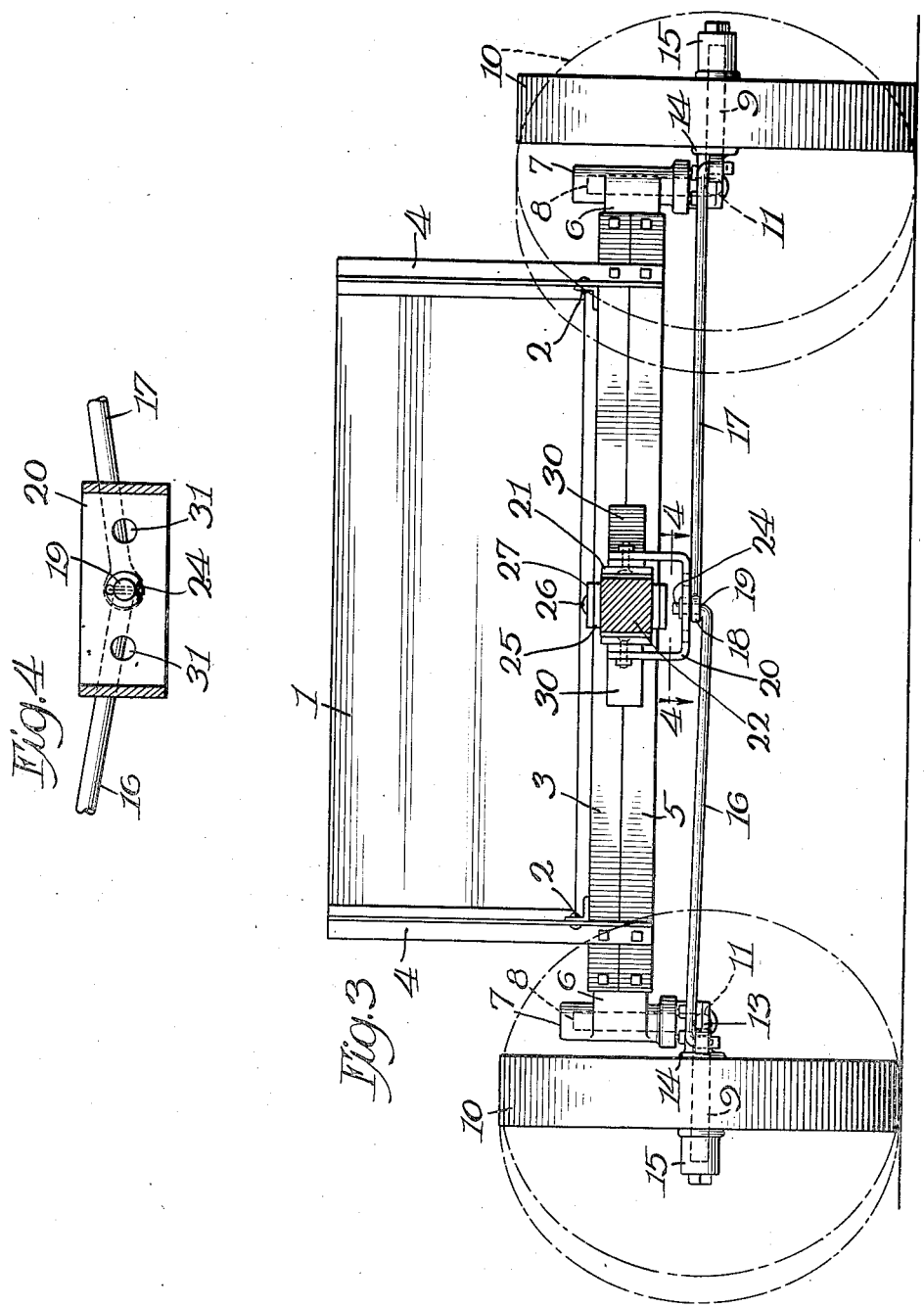
Inventor:
John R. Orelind Patented Feb. 23, 1932

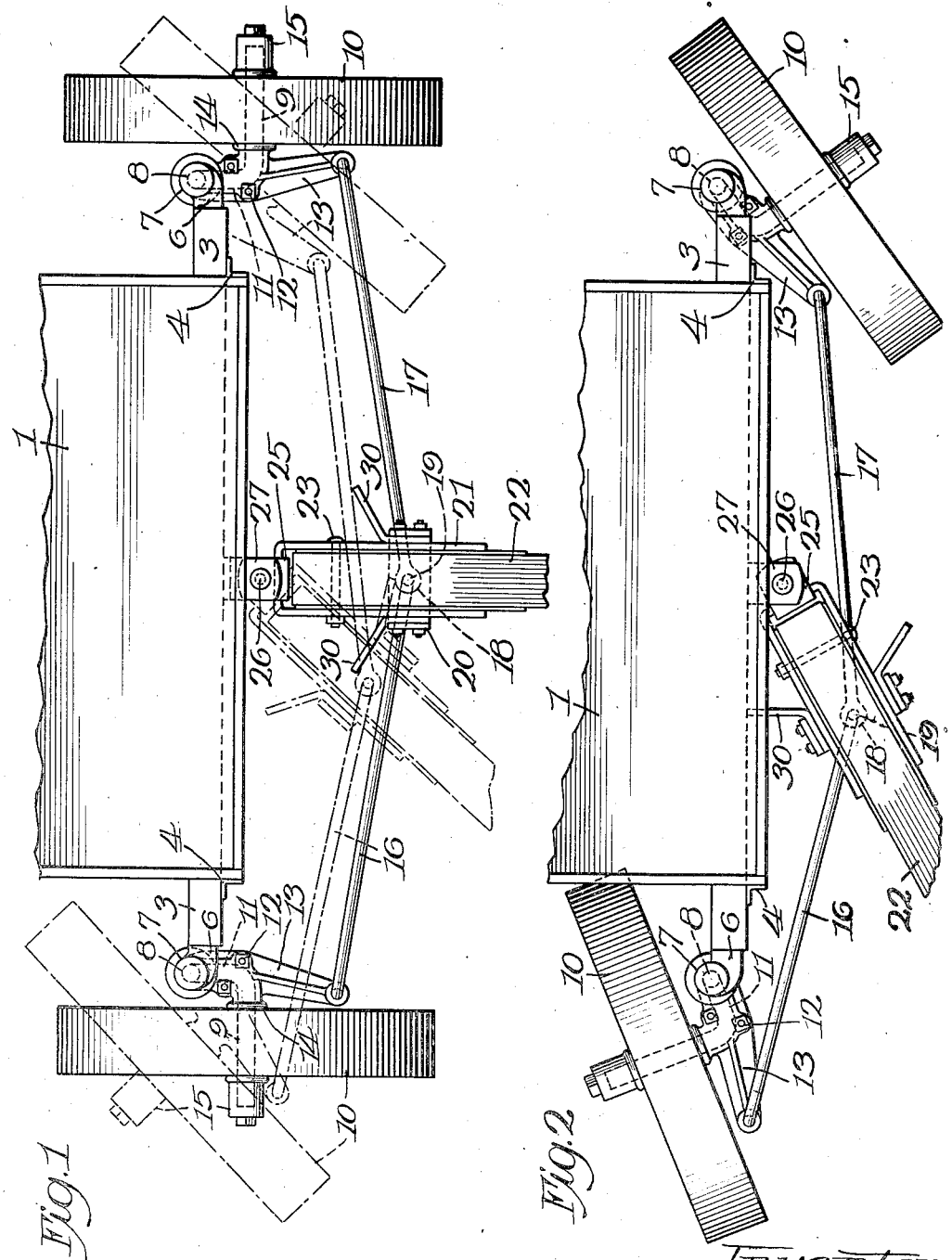

1,846,651

UNITED STATES PATENT OFFICE

JOHN R. ORELIND, OF MOLINE, ILLINOIS, ASSIGNOR, BY MESNE ASSIGNMENTS, TO MINNEAPOLIS-MOLINE POWER IMPLEMENT COMPANY, OF MINNEAPOLIS, MINNESOTA, A CORPORATION OF DELAWARE

VEHICLE FORE-CARRIAGE

Application filed April 30, 1928. Serial No. 273,924.

This invention relates to a vehicle fore-carriage and it is concerned principally with a construction for enabling a vehicle to be turned sharply to the right or left without requiring that the vehicle body be mounted high, that it be undercut, or that an extension be built out in front of the body to carry the front wheels. The invention is especially useful with manure spreaders and it is described in connection with a spreader but it is also useful with wagons, farm trucks, and other vehicles having low bodies or boxes.

In order that a manure spreader may be conveniently used it is necessary that the box or body of the spreader be mounted very low and that the spreader be capable of turning sharply. However, when the box is low, it interferes with the turning of the wheels and the box must, therefore, either be mounted high or some special provision must be made to permit sharp turning. A narrow body having widely spaced wheels is not desirable because the body should be wide in order to take a maximum load. It is also not desirable to undercut the box because a distributing apron runs under and over the box surface thereby introducing complications. It is possible to mount the front wheels on an extension projecting out in front of the box but this increases the length of the spreader and does not give as stable a mounting for the front end as is desired. A difficult problem is thus presented, particularly when simplicity, inexpensiveness and extreme durability are necessary.

The present invention is directed to a solution of this problem, that is, to the provision of a construction that will allow sharp turning and at the same time allow the use of a wide box mounted close to the ground with the wheels positioned at the sides of the box without requiring that said wheels be spaced an unduly wide distance apart.

The general object of the invention is to provide an improved vehicle fore-carriage.

A more particular object is to provide a fore-carriage in which the wheels are mounted so that even though they are positioned relatively close to the sides of a vehicle body they may be turned sharply without striking said body.

Other objects and advantages of the invention will hereinafter appear.

The invention comprehends a construction in which the distance between the wheels and the vehicle body is automatically varied as the vehicle is turned so as to prevent interference between the wheels and body.

An embodiment of the invention is illustrated in the accompanying drawings in which Figure 1 is a plan view of the front end of a vehicle showing the fore-carriage construction with the wheels straight ahead in full lines and turned to an angular position in dotted lines;

Fig. 2 is a view corresponding to Fig. 1 showing the wheels turned sharply to the left;

Fig. 3 is a front elevation showing, in full lines, the wheels positioned straight ahead and, in dotted lines, the position of the wheels when turned to the left;

Fig. 4 is a detail section on the line 4—4 of Fig. 3, showing the guiding pole connections.

The vehicle shown, which is a spreader, has a wide rectangular box 1 mounted in a rigid frame made of angle iron. This frame has two longitudinal beams 2, to which are bolted a plurality of lower cross beams 3, one of which is shown in Fig. 3. Standards 4 are bolted to both the cross and the longitudinal beams, the arrangement being as illustrated in Fig. 3. This provides a very simple, rigid construction that is inexpensive.

The front standards 4 extends down farther than the others and bolted to their lower ends is a second cross beam 5, also made of angle iron. This beam together with the front cross beam 3 forms an axle support which extends beyond the side of the box 1. The outer ends of the beams are bolted to arms 6 having vertically positioned socket members 7 on their ends. These socket members receive the upstanding ends 8 of axles 9 upon which the wheels 10 are journaled.

The axles 9 are offset relative to the cross beams 3 and 5 and relative to their vertical portions 8, that is, each axle has a forwardly projecting portion 11 that positions the wheel bearing portion of its axle forward of the vertical axis 8 about which the axles swing. The portion 11 of each axle together with the axle part on which the wheel is journaled forms an L-shaped axle which swings around the axis of the vertical portion 8.

Fastened to the portion 11 of each axle by bolts 12 is a guiding arm 13 which also forms an inner thrust surface or limiting collar 14 for the wheel that is journaled on the axle, the outer end of the axle carrying a hub cap 15. The left and right guiding arms 13 are connected to links 16 and 17, respectively, that extend toward each other. The end of link 17 has an eye 18 in it and the end of link 16 is bent upward, at 19, said end 19 extending through the eye 18 and through an opening in a U-shaped member 20 bolted to a second U-shaped member 21 (Fig. 1) which is fastened to a guiding pole 22 by a bolt 23. The link is held in position by a cotter pin 24.

The member 21 is fastened to a third U-shaped member 25 pivotally connected by a bolt 26 with a fourth U-shaped member 27 bolted to the cross beams 3 and 5. This provides a mounting for the guiding pole 22 which allows it to swing laterally about the axis of the bolt 26 and vertically about the axis of bolt 23. As the pole swings laterally it carries the links 16 and 17 with it and they swing the guiding arms 13 to swing the wheels about the axis of the vertical portions 8 of the axles.

Bolted on each side of the U-shaped member 21 are projections 30 forming limit stops for limiting the distance to which the guiding pole can be swung laterally in both directions.

It is sometimes desirable to use three horses on a spreader in which event the guiding pole should be swung slightly to one side and the wheels given a lead in one direction. In order to accomplish this the U-shaped member 20 is provided with additional holes 31 (Fig. 4) for the reception of the bent end 19 of link 16. The links are normally positioned in the center hole but if a lead is desired in either direction it may be easily obtained by using one of the side holes 31.

An important feature of this construction is that the mounting of the wheels is such that, when they are turned, the distance between the box and the wheel on the side toward which the spreader is being turned is automatically increased so as to prevent interference between the wheel and the box. This will be clear by referring to Figs. 1 and 2.

Assume that the wheels are straight ahead as shown in full lines in Fig. 1 and that, while the body remains stationary, the wheels are swung around to the position of Fig. 2. In the Fig. 2 position the axle 9 of the left wheel forms an extension of the main cross beam 3—5 and the wheel, in moving out to this position, has moved away from the box 1. It has swung about the axis of the vertical portion 8 of the axle with the length of the axle portion 11 as a radius. The part 11 of the axle is proportioned so that the wheel is thrown out far enough in turning so as to clear the box, the position of the wheel relative to the box being illustrated in dotted lines in Fig. 3. At the same time that the left wheel is moved away from the box, the right wheel is moved toward the box but this does not cause any interference because the wheel moves in front of the front end of the box which is made short enough to provide ample clearance. The position of the two wheels in making a sharp turn is shown in Fig. 2.

In order for the left wheel to move outwardly as above explained it would have to skid or slide a short distance along the ground. Instead of actually doing this, what happens is that, as the wheels are turned, the body 1 moves over. This action will be most easily understood by starting with the wheels in a straight ahead position and assuming that they are turned about vertical axes through the center of their contact with the ground. Referring to Fig. 1, as the left wheel turns, the portion 11 of the axle 9 swings the vertical portion 8 of the axle inward causing the front end of box 1 to move to the right, the box 1 swinging around a vertical axis through the center of the rear axle, one rear wheel revolving slightly forward and the other slightly backward. The swinging at the left front wheel around a vertical axis through its center would also cause the vertical axle portion 8 to move forward. What actually happens, if the spreader is standing still, is that the wheel revolves backward around its axle 9 enough to compensate for the forward movement of the body that would otherwise take place. As the right wheel turns the portion 11 of its axle swings the vertical portion 8 of the axle and the front end of the box 1 to the right, the same as the left wheel. The turning would also swing portion 8 backward, but instead the wheel revolves forward around its axle 9 enough to compensate.

In the description above, it has been assumed that the spreader is standing still. When the spreader is moving all the wheels are revolving around their axles but the relative motion of the body and the wheels when steering is the same as above described. It will be understood that the action takes place when the wheels are moved to the right as well as when they are moved to the left.

This construction enables the box of the spreader to be made wide and to be mounted low. The wheels are located close to the box and at the sides of the front of the box where they furnish a stable support. At the same time the spreader may be turned very sharply, in fact, practically at right angles. These results are obtained without the use of complicated parts or intricate construction. Only a minimum number of parts are employed but these are combined in a novel way to get a result heretofore obtained only by the use of more elements and by a more complicated or impractical association of parts.

Another important advantage is that, as the wheels are steered, the wheel on the side toward which the vehicle is being steered is swung farther than the opposite wheel. This is accomplished by having the arms 13 extend outward slightly as well as forward. Referring to Figs. 1 and 2 it will be noted that as the guiding pole is swung to left the left hand arm 13 swings over into a position such that the radius of action of the link 16 is increasingly shortened so that the axle 9 is swung with increasing rapidity. At the same time the right hand arm 13 is moving through the top of its arc and the radius of action of the link 17 changes very little. The wheels are thus turned so as to follow accurately the arcs through which they must move in turning, these arcs being of different radius as will be obvious, the inner or left hand wheel turning through an arc of smaller radius than the outer or right hand wheel in Figs. 1 and 2.

It is to be understood that the structure shown is for purposes of illustration only and that variations may be made in it without departing from the spirit and scope of the invention as defined by the appendant claim.

I claim:

A vehicle having a body, a socket member fixed to each side of the body near the forward end thereof, a single vertical opening in each socket member, an integral rod like axle for each socket member, each axle having a vertical portion journaled in the vertical opening in its respective socket member, each axle also having a forwardly extending integral portion and a laterally extending integral portion, steering wheels journaled on the lateral portions of said axles, a guiding pole movable relative to said body, and connections between the guiding pole and the axles mounted forwardly and independently of the body for steering said wheels.

In testimony whereof, I have subscribed my name.

JOHN R. ORELIND.